United States Patent
Novotny et al.

(10) Patent No.: US 10,057,601 B2
(45) Date of Patent: Aug. 21, 2018

(54) METHODS AND APPARATUSES FOR FILTERING OF RINGING ARTIFACTS POST DECODING

(71) Applicant: Integrated Device Technology, Inc., San Jose, CA (US)

(72) Inventors: Pavel Novotny, Waterloo (CA); Eric C. Pearson, Conestogo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 8 days.

(21) Appl. No.: 14/746,146

(22) Filed: Jun. 22, 2015

(65) Prior Publication Data

US 2016/0373787 A1 Dec. 22, 2016

(51) Int. Cl.
| | |
|---|---|
| *H04N 19/86* | (2014.01) |
| *H04N 19/117* | (2014.01) |
| *H04N 19/14* | (2014.01) |
| *H04N 19/176* | (2014.01) |
| *H04N 19/42* | (2014.01) |

(52) U.S. Cl.
CPC ........... *H04N 19/86* (2014.11); *H04N 19/117* (2014.11); *H04N 19/14* (2014.11); *H04N 19/176* (2014.11); *H04N 19/42* (2014.11)

(58) Field of Classification Search
CPC .... H04N 19/86; H04N 19/117; H04N 19/124; H04N 19/176; H04N 19/44
USPC .................................................. 375/240.29
See application file for complete search history.

(56) References Cited

U.S. PATENT DOCUMENTS

| | | | | |
|---|---|---|---|---|
| 5,559,722 | A | * | 9/1996 | Nickerson ................ H04N 7/15 341/50 |
| 5,844,627 | A | | 12/1998 | May et al. |
| 6,314,208 | B1 | * | 11/2001 | Konstantinides ....... G06T 9/005 382/239 |
| 6,657,676 | B1 | | 12/2003 | Borneo et al. |
| 7,046,307 | B1 | | 5/2006 | Hui |
| 7,203,234 | B1 | * | 4/2007 | Zeng ...................... G06T 5/002 348/699 |
| 8,923,642 | B2 | * | 12/2014 | Sato ..................... H04N 19/172 382/199 |
| 2002/0181583 | A1 | * | 12/2002 | Corbera .............. H04N 19/176 375/240.03 |
| 2003/0053711 | A1 | * | 3/2003 | Kim ........................ H04N 19/86 382/268 |
| 2003/0235248 | A1 | * | 12/2003 | Kim ........................ H04N 19/86 375/240.12 |
| 2004/0091168 | A1 | * | 5/2004 | Jones ....................... G06T 5/20 382/261 |

(Continued)

*Primary Examiner* — Christopher S Kelley
*Assistant Examiner* — Kathleen Walsh
(74) *Attorney, Agent, or Firm* — Christopher P. Maiorana, PC

(57) ABSTRACT

A technique to perform filtering of ringing artifacts is disclosed herein. An example apparatus may include a decoder configured to receive a bitstream, decode the bitstream into blocks, identify conditions in the blocks associated with generation of ringing artifacts, and filter the ringing artifacts from one or more of the blocks responsive to identification of the conditions by the decoder. An example method may include detecting conditions in a bitstream that lead to ringing artifacts, configuring a filter based on the conditions, and filtering the ringing artifacts from blocks of decoded bitstream.

18 Claims, 4 Drawing Sheets

(56) References Cited

U.S. PATENT DOCUMENTS

| | | | |
|---|---|---|---|
| 2005/0008075 A1* | 1/2005 | Chang | H04N 19/176 375/240.03 |
| 2005/0276505 A1* | 12/2005 | Raveendran | H04N 19/176 382/268 |
| 2006/0245499 A1* | 11/2006 | Chiu | H04N 19/176 375/240.18 |
| 2007/0071095 A1* | 3/2007 | Lim | H04N 19/86 375/240.08 |
| 2007/0242288 A1 | 10/2007 | Fan | |
| 2008/0085060 A1 | 4/2008 | Bosco et al. | |
| 2008/0253682 A1* | 10/2008 | Zhong | G06T 5/002 382/275 |
| 2009/0041373 A1 | 2/2009 | Incesu et al. | |
| 2009/0080798 A1* | 3/2009 | Maurer | H04N 19/176 382/275 |
| 2009/0153739 A1 | 6/2009 | Hong | |
| 2010/0027905 A1* | 2/2010 | Zhang | G06T 5/002 382/261 |
| 2010/0111424 A1* | 5/2010 | Suzuki | H04N 19/86 382/199 |
| 2010/0220939 A1 | 9/2010 | Tourapis et al. | |
| 2012/0030219 A1 | 2/2012 | Xu et al. | |
| 2012/0039389 A1* | 2/2012 | Sjoberg | H04N 19/105 375/240.03 |
| 2012/0162525 A1* | 6/2012 | Schoner | H04N 19/00909 348/607 |
| 2015/0085943 A1* | 3/2015 | Taniguchi | H04N 5/21 375/240.29 |
| 2015/0379693 A1 | 12/2015 | Novotny et al. | |
| 2016/0088316 A1 | 3/2016 | Novotny | |

* cited by examiner

METHODS AND APPARATUSES FOR FILTERING OF RINGING ARTIFACTS POST DECODING

TECHNICAL FIELD

Embodiments of the present invention relate generally to video decoding, and examples of filtering of ringing artifacts post decoding. Further examples include methods of and apparatuses for filtering of ringing artifacts from decoded video.

BACKGROUND

Broadcasting images, whether they are videos or still images, conventionally requires some level of encoding. The quality of the encoded images post decoding, perhaps to a viewer receiving the broadcast images and viewing them on a monitor, may be affected by ringing artifacts. The ringing artifacts may have been introduced by the encoding process. Conventional decoding, however, may not be able to reliably eliminate or reduce the ringing artifacts. The reduced ability to eliminate the ringing artifacts may be due to the difficulty in reliably detecting the ringing artifacts by a decoder. Further, features of the video may occasionally be mistakenly detected as ringing artifacts and filtered out. Thus, for high quality, high definition images, it may be desirable to reduce or eliminate ringing artifacts without filtering out features of the video.

DETAILED DESCRIPTION

Figure 1:
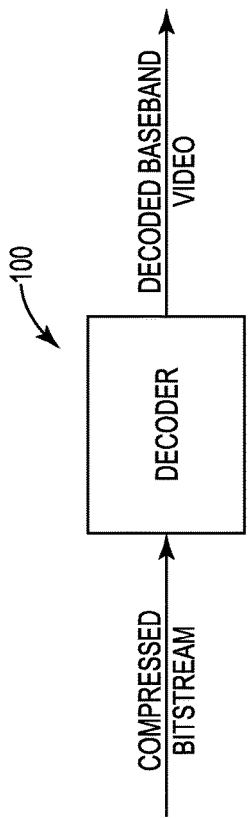
FIG. 1 is a block diagram of a video decoder according to the present disclosure.

Various example embodiments described herein include methods and apparatuses for filtering of ringing artifacts from decoded video. A de-ringing filter may be enabled and/or configured based on the presence of conditions that introduce ringing artifacts into a compressed bitstream instead of attempting to detect the ringing artifacts. These conditions may at least include sharp edges and/or fine detail in a frame along with a high level of compression of an associated compressed bitstream. The de-ringing filter may account for edges within the frames while filtering the ringing artifacts. By taking the presence of sharp edges in frames into account, the de-ringing filter may filter the frames to eliminate or reduce the presence of the ringing artifacts without blurring edges or blurring fine details contained within the frames.

The de-ringing filter may perform the filtering at the pixel level of the decoded frames (e.g., an image) of the decoded baseband video. Decoded baseband video may include one or more frames. Further, each frame may be broken down into various sized elements, such as macroblocks for example. All of the pixels of a frame may be filtered before a subsequent frame is filtered. The filtering operations may be performed across the entire frame or on blocks or macroblocks of the frame.

The transmission of frames may involve encoding the frames before being broadcast. The encoding, for example, may convert baseband video, where the baseband video may include one or more frames, into a compressed bitstream suitable for transmission such as by a broadcast system. The encoded and broadcast frames may have been captured by video equipment (e.g., digital video recorders, film-based cameras, still cameras, and etc.). The captured frames may include edges and fine detail (e.g. text). Subsequent to broadcast yet prior to viewing or rebroadcasting, the compressed bitstream may at least be decoded. The decoding may conventionally follow the encoding, e.g., use the same format or compression scheme to decode as was used to encode.

Occasionally, however, due to features of the baseband video, e.g., sharp edges, and a high level of compression of the bitstream, ringing artifacts may be introduced into the bitstream. These ringing artifacts may manifest around the sharp edges of the decoded baseband video. The ringing artifacts may be difficult to detect on their own, yet the conditions that produce them may be more readily detected. For example, a high compression factor and sharp edges within the video may be used as an indication that ringing artifacts may be present. The detection of those conditions may subsequently be used to enable and/or configure the de-ringing filter. For example, the compression factor and the edges may be used to determine a filtering threshold for filtering potential ringing artifacts prior to viewing and/or rebroadcasting, e.g., re-encoding, the baseband video. Further, the filtering may be tailored so that the edges within the video are not blurred, e.g., the filter employs an edge-aware technique based on the filtering threshold.

FIG. 1 is a block diagram of a decoder 100 according to the present disclosure. The decoder 100 may filter ringing artifacts from decoded baseband video. The ringing artifacts may have been introduced into the compressed bitstream as a result of the encoding. The de-ringing filtering, which may also be referred to as de-ringing filtering, may be performed by the decoder 100 in conjunction with or subsequent to decoding. The de-ringing filtering may be used on a frame or a macroblock of a frame to filter out any ringing artifacts present. The decoder 100 may be implemented in hardware, software, or combinations thereof. In some embodiment, the de-ringing filtering may performed by an edge-aware spatial filter, but the type of filter is not limiting. Other filters known in the art that account for maximum differences between pixel values within a frame or block may also fall within the scope of the present disclosure.

Detection of the ringing artifacts may be difficult and techniques that detect, or attempt to detect, the ringing artifacts may lead to partial and/or unwanted filtering. Partial filtering may be characterized as only filtering some of the ringing artifacts in a frame. Unwanted filtering may be characterized as filtering of features in the frames that are not ringing artifacts, but where instead detected as ringing artifacts. The decoder 100 may detect conditions of the compressed bitstream and features of the decoded frames to enable and/or configure the de-ringing filtering instead of attempting to detect the ringing artifacts. Detection of the conditions that conventionally lead to the introduction of ringing artifacts may be more reliable and more easily implemented than schemes for detecting ringing artifacts.

Further, the detected conditions may also inform the decoder 100 of how the de-ringing filtering may be configured. One or more configuration parameters for configuring the de-ringing filtering may be influenced by a compression factor of the compressed bitstream and by a maximum difference in pixel values within one or more frames or blocks of the decoded baseband video. For example, a quantization used to encode the compressed bitstream and the presence of edges within the decoded baseband video may be used to determine a configuration parameter for the de-ringing filtering. A maximum difference (MD) value may be determined based on pixel values of a frame or block and the quantization parameter to set a filtering threshold. The MD value may be a configuration parameter for the de-ringing filter that is based on, e.g., determined from, the detected conditions. As a result, pixel values below the threshold may be filtered while pixel values above the threshold may be considered edges, which may not be filtered or included in the filtering process, e.g., pass through the de-ringing filtering.

Additionally, conventional spatial filtering may have deleterious effects on fine detail and edges due to averaging of adjacent pixels that cross an edge, for example. An edge in this context may be a change in brightness, color, and/or contrast that may create a sharp change within the frame. For example, an edge would be created between a dark shadow and a sun-lit wall—the boundary line between the two regions being the edge. Conventional spatial filtering may blur such edges and fine details, which may be unfavorable. Thus, to prevent or reduce the blurring of edges, the filtering of the ringing artifacts may be performed by a filter that accounts for edges while filtering out the ringing artifacts so that the sharpness, e.g., quality, of the edges are preserved.

In operation, the decoder 100 may receive a compressed bitstream. As used herein and for sake of brevity, the terms "bitstream" and "compressed bitstream" may be synonymous in that, generally, bitstreams received by the decoder 100 may have been encoded (which may include compression) by an encoder prior to their receipt at the decoder 100. The decoder 100 may decode the bitstream according to the format used to encode the bitstream, and provide decoded baseband video in response. For example, the bitstream may have been encoded based on the MPEG2 format, which may inform the decoder 100 how to decode the bitstream. The decoded baseband video may include video or still images. The decoded baseband video may be formed from smaller components such as frames, which may be further divided into blocks or macroblocks. Occasionally, one or more of the frames, blocks, or macroblocks may display conditions that may indicate the presence of ringing artifacts in a block of the decoded baseband video. These conditions may be extracted from the bitstream and the decoded baseband video. For example, blocks of the bitstream may have been encoded with a high compression parameter and may also include one or more sharp edges. At least the combination of these two conditions may indicate the potential for ringing artifacts. The decoder 100, based on the presence of the conditions, may enable de-ringing filtering and filter the block or blocks to reduce or eliminate any ringing artifacts that may be present, e.g., introduced by the encoding process. Additionally, the decoder 100 may employ a de-ringing filter that is edge-aware. Being edge-aware, the de-ringing filter may filter the ringing artifacts while preserving edges and fine details included in the blocks.

The decoder 100 may then provide decoded and filtered baseband video. The filtered baseband video may be provided to a viewer and/or provided to a subsequent encoder. For example, the decoder 100 may be included in a transcoder, which may decode the bitstream, filter ringing artifacts, and re-encode the baseband video for rebroadcasting. Filtering the ringing artifacts before encoding may improve the quality of the encoding since the ringing artifacts, due to their random quality, may be difficult to encode.

Figure 2:
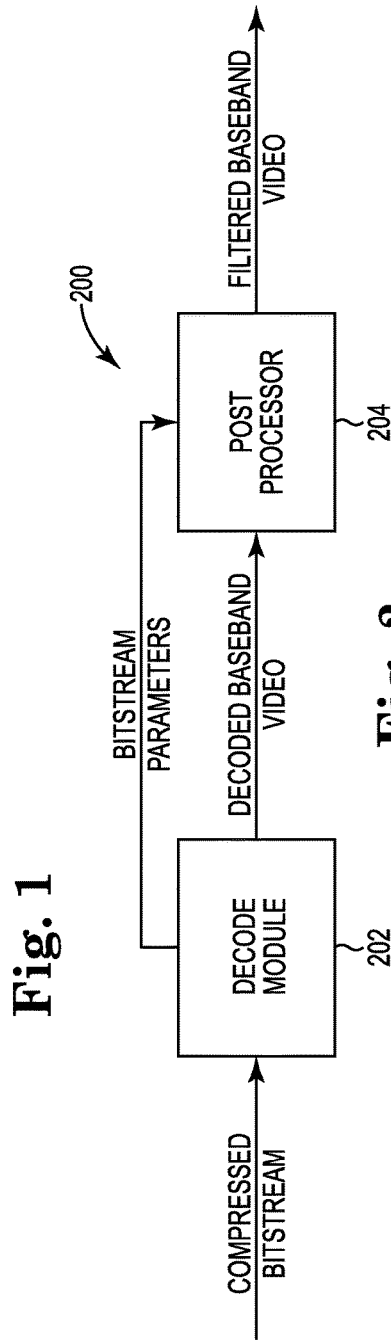
FIG. 2 is a block diagram of a video decoder according to the present disclosure.

FIG. 2 is a block diagram of a decoder 200 in accordance with the present disclosure. The decoder 200 may include a decode module 202 and a post-processor 204. The decode module 202 may decode the bitstream in accordance with the encoding of the bitstream. The post-processor 204 may be included with the decoder 200 and may assist with and/or perform de-ringing filtering. In some examples, components of the post-processor 204 may be included with the decode module 202 while other components may be separate from the decode module 202. The post-processor 204 may be able to perform de-ringing filtering for the removal of ringing artifacts along with various other operations, such as preservation of edge features included in the decoded baseband video. The decoder 200 may be implemented in hardware, software, or combinations thereof. For example, the decode module 202 and aspects of the post-processor 204 may be implemented in hardware while remaining aspects of the post-processor 204 may be implemented in software. The decoder 200 may receive a bitstream and provide filtered baseband video that may be free from ringing artifacts that may have been introduced during the encoding process.

The post-processor 204 may filter ringing artifacts present in the decoded baseband video. The decoded baseband video may be filtered at a frame, block or macroblock level. Further, the post-processor 204 may use a de-ringing filter to remove or reduce ringing artifacts that may be included in the decoded baseband video. In some examples, the de-ringing filter may be an edge-aware spatial filter that takes edges into account when filtering the decoded baseband video. The post-processor 204 may detect conditions in the bitstream and/or the decoded video to enable filtering of one or more blocks of the baseband video. Additionally, the post-processor 204 may configured the de-ringing filtering based on the detected conditions. For example, the post-processor 204 may detect that the bitstream was compressed, e.g., encoded, using a high quantization parameter, which may have been provided to the post-processor 204 by the decoder module 202. The post-processor 204 may additionally determine when one or more of the blocks of the baseband video include edges. Based on the presence of these two conditions, the post-processor 204 may enable and/or configure the de-ringing filtering based at least in part on the quantization parameter and further based on the presence of the edges. Since the conditions and parameters change per block of the baseband video, the post-processor 204 may reconfigure the de-ringing filtering for each block of the decoded baseband video that is filtered.

Based on the observed conditions, the post-processor may determine the configuration parameter for filtering each block. The configuration parameter may be based on the quantization parameter of a block and a maximum activity of the block. The maximum activity may be a measure of a maximum difference in pixel values occurring within the block. A maximum difference (MD) parameter may be based on the maximum activity and scaled by the quantization parameter. The MD parameter may indicate a filtering threshold for the de-ringing filtering. For example, pixel differences below MD may be filtered while pixel differences above MD may be passed. Accordingly, the post-processor 204 may determine an MD parameter for a block based on the block's associated quantization parameter and the maximum activity calculated for the block, where the maximum activity is determined by the range of pixel differences within the block. The MD parameter may then be used to configure the de-ringing filtering performed by the post-processor 204.

In operation, the decode module 202 may receive a bitstream, decode the bitstream, and provide the decoded baseband video to the post-processor 204. In some embodiments, the bitstream may have been encoded using the MPEG2 format, which may then inform the decode module 202 how to decode the bitstream. Additionally, the decode module 202 may extract the quantization parameter for each block of the decoded baseband video from the bitstream and provide the quantization parameter to the post-processor 204. As such, the decode module 202 may provide to the post-processor 204 the decoded baseband video in frames or blocks along with respective quantization parameters.

The post-processor 204 determines, for each block, whether de-ringing filtering may be warranted based on the respective quantization parameter and whether edges are present in the block. The bitstream parameter and the presence of edges in the decoded frame may both be used to enable and configure the de-ringing filtering performed by the post-processor 204. In some examples, blocks that include edges and that had been encoded with a high quantization parameter may enable de-ringing filtering by the post-processor 204. In some examples, the blocks may be processed through the de-ringing filtering regardless of the presence of edges or the level of the respective quantization parameter, but the configuration parameters of the de-ringing filter may be adjusted to not affect the decoded blocks unless both a high quantization parameter and an edge are both associated with a block.

Based on the post-processor 204 enabling the de-ringing filtering, the maximum activity for a to-be filtered block may be determined. The maximum activity may be based on a maximum absolute difference between all pixels in a block. For example, a block of 8×8 pixels may be analyzed to determine the maximum absolute difference between two adjacent pixels—either vertically or horizontally. This maximum absolute difference may indicate the presence of an edge located between the two pixels. That maximum activity may affect the filtering threshold based on MD. For example, the maximum activity may be scaled by the quantization parameter, and a blocking point number to provide the MD parameter. The blocking point number may be compression format dependent. The MD parameter may then be used by the post-processor 204 to establish the filtering coefficients for the de-ringing filtering. In some embodiments, two filtering thresholds may be used to determine the filtering coefficients.

The post-processor 204 may filter the blocks at the pixel level, and each pixel may be filtered referencing only pixel values within the block. For example, the post-processor 204 may take into account pixel values for two pixels one each side of a target pixel, e.g., the pixel being filtered, to produce a filtered pixel value. This process may be done in both the horizontal and vertical directions. During de-ringing filtering, the post-processor 204 may determine when an edge falls within the range of pixels being filtered. If an edge is detected, the pixel associated with the edge may be omitted from the filtering process so that the edges are not blurred. The pixel values may be in Red Green Blue (RGB) or luminance/chrominance format. In the RGB format, the de-ringing filtering may be applied separately to each color plane. In the luma/chroma format, the noise-deringing filtering may also be separately applied to each plane forming the frame. The blocks filtered by the decoder 200 may be blocks of 8 pixels by 8 pixels. The decoder 200 may, as a result, provide the filtered baseband video to a viewer and or an encoder, for example.

Figure 3:
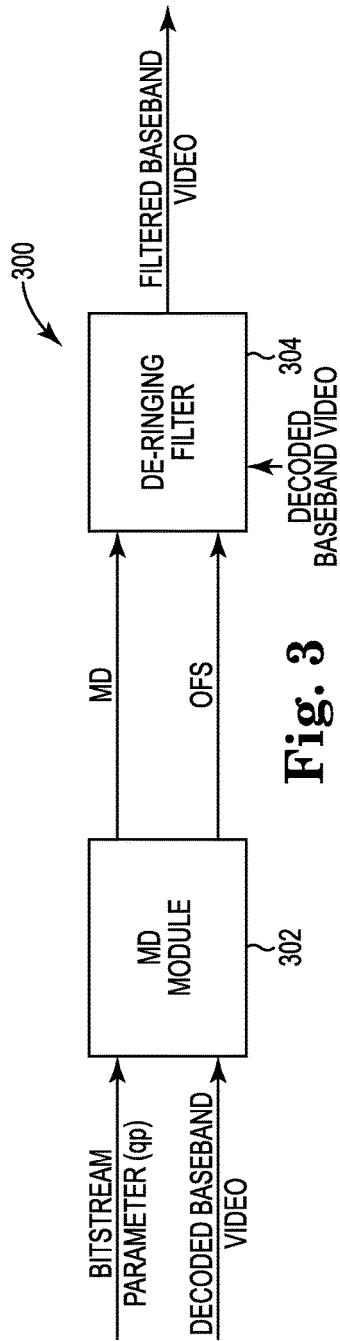
FIG. 3 is a block diagram of a post-processor according to the present disclosure.

FIG. 3 is a block diagram of a post-processor 300 in accordance with the disclosure which may implement edge-aware spatial noise filtering. The post-processor 300 may include an MD module 302 and a de-ringing filter 304. The post-processor 300 may be combined with an encoder, such as the encoder 100 of FIG. 1, or the post-processor 300 may be a separate component in a decoding system. In either arrangement, the post-processor 300 may receive decoded baseband video and provide filtered baseband video in response. The baseband video provided by the post-processor 300 may have been filtered using the de-ringing filter 304 as configured by parameters provided by the MD module 302 in accordance with this disclosure. For example, the baseband video may have been filtered so that edges are preserved. The de-ringing filter 304 may receive configuration parameters from the MD module 302 to at least set a filter threshold for a block of pixels. The de-ringing filter 304 may also receive the decoded baseband video.

The MD module 302 may receive decoded baseband video, which may be received in blocks, along with the bitstream parameter, e.g., the quantization parameter. Each block may have a respective quantization parameter. Based on the blocks of the baseband video and their respective quantization parameters, the MD module 302 may determine a MD parameter. The MD parameter may be provided to the de-ringing filter 304 along with a filter strength parameter, ofs. The ofs parameter may be set to zero to configure the de-ringing filter for a maximum filtering strength. While ofs values greater than one may reduce the strength of the filter, an ofs value of zero may be desirable to reduce or eliminate the ringing artifacts. As noted above, the MD parameter may be based on a maximum activity, maxact, determination of the pixel values in the respective block and various scaling factors. The MD parameter may determine the one or two filter thresholds of the de-ringing filter 304.

The MD parameter may be defined as limit*maxact/128, where limit is the quantization parameter scaled by the blocking point number, and maxact is the maximum pixel difference between two adjacent pixels within a block. The factor of 128 may be based on the number of bits used to represent the pixel values. For example, 128 may be used when pixel values are represented by an 8-bit value. The blocking point number is scaling factor based on the compression format. For example, if the mpeg2 format is used for encoding, then the blocking point number may be 21/16. Maxact may be defined as $$\max act = \max(\max(|\text{pixel}_{x,y} - \text{pixel}_{x+1,y}|_{x=0,y=0}^{x<7,y<8}), \quad (1)$$
$$\max(|\text{pixel}_{x,y} - \text{pixel}_{x,y+1}|_{x=0,y=0}^{x<8,y<7}))$$

which may determine the maximum pixel level activity within a block of pixels in both the horizontal and vertical directions.

The de-ringing filter 304 may filter ringing artifacts from blocks while preserving edges contained within the block, e.g., edge-aware filtering without blurring or smoothing edges and fine details. An example edge-aware noise filter may be described in U.S. application Ser. No. 14/316,329 filed Jun. 26, 2014, entitled "Methods and Apparatuses for Edge Preserving and/or Edge Enhancing Spatial Filter, which application is incorporated herein by reference in its entirety for all purposes. The edge-aware filtering may be adaptive because it may filter across edges no matter where the edge falls within a length of the filter. The de-ringing filter 304, based on weighting factors generated for each pixel, may omit or reduce a pixel from the filtering operation based on a difference in pixel values, wherein the weighting factors may be based on the MD parameter. This difference in pixel values, along with the configuration parameters, may allow the filter to determine whether to include a pixel in the filtering calculation and, if so, how much weight should be assigned to that pixel value. The final outcome may be pixel values having ringing artifacts filtered out all while preserving edges within a block.

The de-ringing filter 304 may apply adaptive weighting factors to the adjacent pixels surrounding the center pixel of the filter length to account for edges that may fall within the length of the filter. The adaptive weighting factors may be based on an absolute difference in pixel value between the center pixel and the filter pixel associated with the weighting factor. This difference may inform the filter how similar in value the two pixels are. If the absolute difference is less than the MD parameter, e.g., a first configurable threshold, the weighting factor may be set to a maximum and the adjacent pixel value may be used by the filter. The maximum may be based on the encoding format and the number of bits used for each pixel. For example, if the system uses 8-bits to represent a pixel value, then the pixel value range may be from 0 to 256. If the absolute difference is greater than the first threshold but less than a second threshold (e.g., two times the MD parameter), the weighting factor may be based on a linear interpretation between the first and second thresholds. The linear interpretation may go from the maximum value, e.g., 256, to zero within a number of deltas, e.g., the absolute differences between the center pixel and the pixel associated with the weighting factor. The weighting factor may be zero for any absolute differences above the second threshold. As such, if the filter crosses an edge, the pixels that are dissimilar (e.g., greater than the second threshold) in value to the pixel being filtered may receive weighting factors of zero, which would effectively remove them from the filtering calculation. This would result in the ringing artifacts being filtered out of the pixel based on averaging over equally weighted pixels but without the edge being smoothed due to the large differences between pixels on both sides of the edge.

For example, the de-ringing filter 304 may implement an adaptive filter. The de-ringing filter 304 may be configured to filter across the pixels of a block in one direction and then again in the perpendicular direction, e.g., horizontally then vertically or vice versa. Any order of filtering, however, may be used. The de-ringing filter 304 may filter entire frames or it may filter blocks of an image, blocks of 8×8 pixels for example. The configuration parameters may be modified for every block of pixels as received from the MD module 302. The size of the block given may indicate the size of the post filtered block, as such, the number of input pixels may be dependent upon the size of the filter. For example, the adaptive filter may provide a filtered 8×8 block of pixels based on an 8×8 block of input pixels.

A block of pixels of an input block may be filtered by the de-ringing filter 304 horizontally then vertically to provide a final filtered output block of pixels. The number of input pixels chosen for either or both orientations may be based, at least in part, on the size of the filter utilized by the de-ringing filter 304. For example, a five-tap filter may generate eight filtered pixels from 8 input pixels with the center pixel of the filter being the target or filtered pixel. Thus, an input block with a size of 8 pixels (rows) by 8 pixels (columns) may be filtered both horizontally (along the rows) then vertically (along the columns) to provide an 8 pixel by 8 pixel output block of filtered pixels.

To further illustrate, a row of 8 pixels may be filtered using a filter length of five pixels. The center pixel in the filter length of five may be filtered to generate the corresponding filtered pixel by computing a weighted average of the five pixels in the filter, e.g., the center pixel plus the two pixels on each side of the center pixel. The center pixel of the filter has two adjacent pixels and two pixels separated by one pixel. As such, a five pixel filter may start with the third pixel in a row (or column) of 8 since that would be the first center pixel, e.g., the first pixel to have two pixels on both sides. Similarly, the sixth pixel in the row (or column) of 8 may be the last to be filtered for the same reason. However, for pixels that are at the edge of the image, e.g., at the edge of a frame and that do not have two pixels on at least one side, the non-existent pixels may be given a weighting factor of 0 to eliminate their impact on the filtering.

The de-ringing filter 304 may determine a weighting factor $K_X$ for a pixel$_X$ based on an absolute difference between pixel values for that pixel and the pixel being filtered, e.g., delta$_x$, the MD and the 2*MD parameters. The de-ringing filter 304 may determine the weighting factor for a specific delta$_x$ by first determining a relation between the delta$_x$ and the first threshold value MD. If a delta$_x$ is less than MD, for example, then the de-ringing filter 304 may assign a maximum value to that $K_X$, 256 for example. For delta$_x$ values greater than 2*MD, the de-ringing filter 304 may assign a value of zero, which may indicate an edge falls between the two pixels. As such, this pixel value may not contribute to the calculation of the filtered pixel value. Lastly, if the delta$_x$ value falls between MD and 2*MD, then the weighting factor $K_X$ may be determined from a linear interpolation of delta$_x$ values between MD and 2*MD. This linear interpolation may allow for lower weighting factors to be assigned to pixels with varying differences between its value and the center pixel value. For example, the closer the delta$_x$ is to 2*MD, the lower the corresponding $K_X$ value may be. Accordingly, pixels with delta$_x$ values below MD may be included in the filtering process, pixels with delta$_x$ values above 2*MD may be omitted form the filtering process, and pixels with delta$_x$ values between MD and 2*MD may variably influence the filtering process. As a result, the determination of the edges may allow the de-ringing filter 304 to filter ringing artifacts without affecting edges in the blocks.

Figure 4:
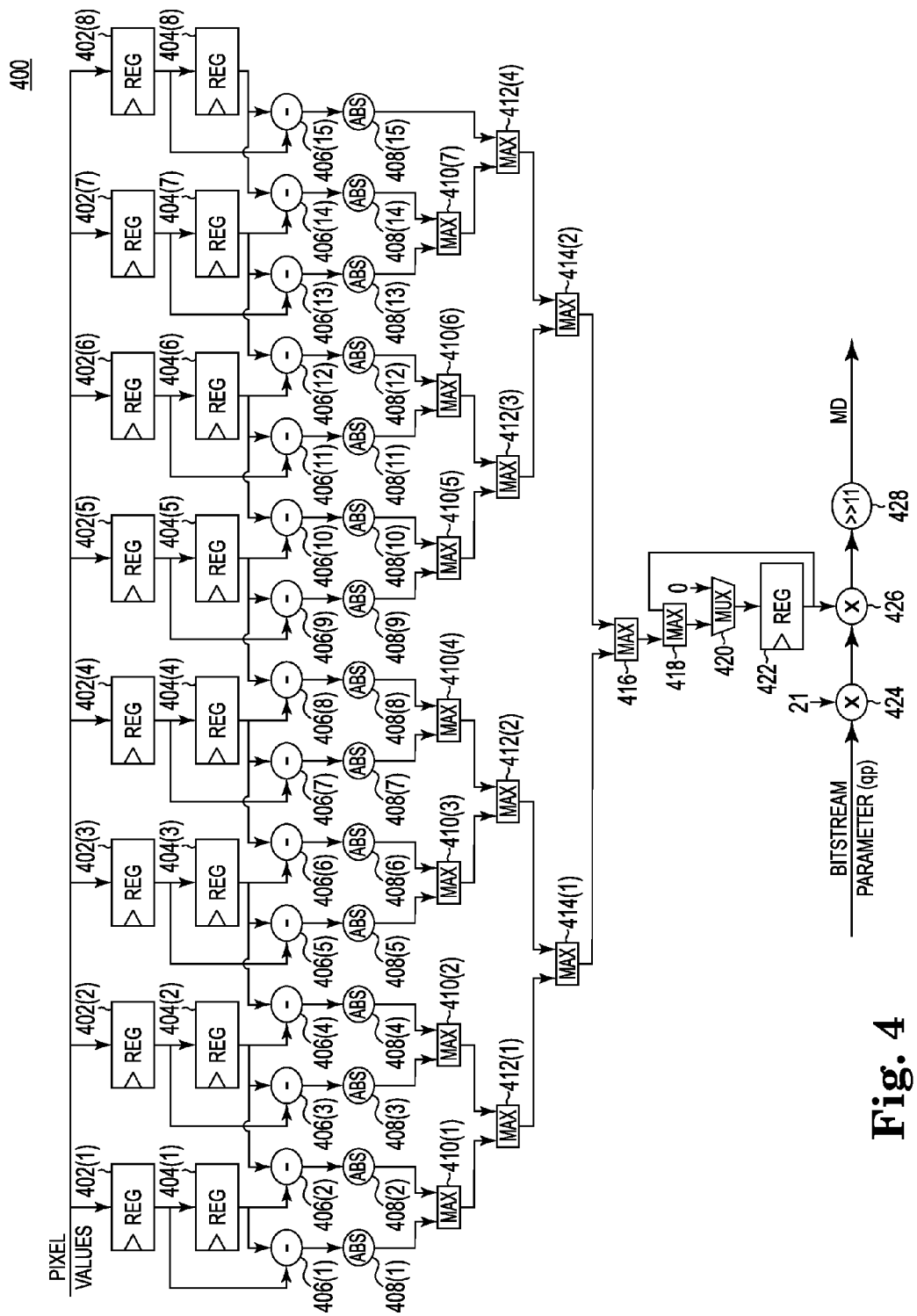
FIG. 4 is an illustrative example of a maximum difference processing module according to the present disclosure.

FIG. 4 is an illustrative example of a maximum difference module 400 according to the present disclosure. The maximum difference (MD) module 400 may be used for the MD module 302 of FIG. 3, and may determine an MD parameter for a block of baseband video. The MD parameter, as discussed above, may be used to establish a filtering threshold for a de-ringing filter, such as the de-ringing filter 304 of FIG. 3. The MD module 400 may be implemented in hardware, software, or a combination thereof. For example, the determination of the maximum activity of a block may be implemented in hardware, while the scaling of the maximum activity may be implemented in software. An MD configuration parameter determined by the MD module 400 may be provided to a de-ringing filter used to filter ringing artifacts from blocks of decoded baseband video.

The MD module 400 may include a plurality of registers 402(1) through 402(8), and 404(1) through 404(8). Each of the plurality of register 402 and 404 may receive the pixels of a block. For illustration purposes only, a block of 8×8 pixels will be used to describe the MD module 400, but blocks of any dimension fall within the scope of the present disclosure. Blocks of other dimensions may require the MD module 400 to be scaled, but the operation and outcome would not be affected. For example, 8 pixels of a block are processed in parallel per clock cycle. Thus, an 8×8 block of pixels may determine the corresponding MD parameter in 8 clock cycles.

The MD module 400 may also include a plurality of subtracters 406(1) through 406(15), and a plurality of absolute elements (tabs) 408(1) through 408(15). Each of the plurality of subtractors 406 determines a difference in pixel values between adjacent pixels—both vertically and horizontally. Each of the plurality of abs 408 determines the absolute value of the outputs of respective subtractors 406. The outputs of the absolute elements 408 may then proceed through a cascade of maximum difference elements (max) 410 through 418 to determine the maximum difference within the 8×8 block of pixels. The maximum difference may be the maximum activity discussed above.

The subtractors 406 may be broken down into two groups—a temporal group and a spatial group. The division may be used to illustrate the MD module 400. For example, the subtractors 406(1), (3), (5), (7), (9), (11), (13), and (15), e.g., the odd numbered subtractors 406, may be referred to as the temporal subtractors 406. The odd numbered subtractors 406 may be referred to as the temporal subtractors since they determine a difference in pixel values between pixels clocked into the registers 402, 404 at different clock cycles. The temporal reference does not imply pixel values from blocks of the decoded baseband video that are different in time, but instead refers to pixel values from the same block but input into the registers at different clock cycles. The even number subtractors 406, such as the subtractors 406(2), (4), (6), (8), (10), (12), and (14), may be referred to as the spatial subtractors 406. The spatial subtractors 406 may determine a difference in pixel value between adjacent pixels clocked in at the same clock cycle.

The MD module 400 further includes a multiplexer (mux) 420, a register 422, a multiplier 424, a multiplier 426, and a right shifter 428. The mux 420 may select between a maximum value provided by the maximum difference element 418 and a zero value. The zero value may be selected between blocks so that the register 422 is cleared. The register 422 may hold the output of the mux 420 for one or more clock cycles and provide its contents to the multiplier 426. The multiplier 424 may multiply the quantization parameter of a block by the scaling factor 21, which the result of is provided to the multiplier 426. The multiplier 426 in turn multiplies the scaled quantization parameter by the contents of the register 422, and provides the result to the right shifter 428. The right shifter 428 shifts the input by 11, which may be equivalent to dividing the input by 2048. The 2048 value may correspond to 16 times 128, where the value of 16 is part of the blocking point number discussed above, and the value of 128 is part of the formula for calculating MD. The right shifter 428 may then provide the MD value corresponding to a block of decoded baseband video. The MD parameter may be defined as noted above, such as by (qp*21*maxact)/(128*16). Thus, the MD module 400 determines the MD parameter for a block of pixels based on a maximum activity of pixel values and the corresponding quantization parameter.

In operation, the MD module 400 may receive eight pixel values of an 8×8 block per clock cycle, e.g., a block of eight rows of eight pixels. For example, the values for a first row of eight pixels may be input into the first set of registers at a first clock cycle. Accordingly, upon a first clock cycle, the registers 402(1)-(8) would contain pixel values for eight adjacent pixels. For example, register 402(1) may contain the pixel value for pixel 1, register 402(2) may contain the pixel value for pixel 2, and so on ending with register 402(8) containing the pixel value for pixel 8. No processing or use of the result at 416 may be performed until the second clock cycle. During the first clock cycle, the mux 420 may select value 0.

Upon a subsequent clock cycle, a second clock cycle, the first eight pixel values may be provided to the registers 404(1)-(8), respectively, and also to the temporal and spatial subtractors 406, while pixel values for a next row of pixel values, e.g., a second row of the eight row block, would be received by the registers 402(1)-(8). Additionally during the second clock cycle, the temporal subtractors 406 may determine a difference between respective pixel values of the two rows and provide the result to respective abs 408, e.g., odd numbered abs 408 in this embodiment. For example, the pixel value for row 1 pixel 1 and the pixel value for row 2 pixel 1 may be received by the subtractor 406(1), which may determine the difference between the two pixel values and provide the result to respective abs 408(1). This same sequence may be applied to pixel values for pixels 2 through 8. Further during the second clock cycle, the spatial subtractors 406 may receive pixel values for adjacent pixels receive in the same clock cycle (the first clock cycle in this example), determine their difference, and provide the result to respective abs 408, e.g., odd numbered absolute elements in this embodiment. For example, the pixel values in registers 404(1) and 404(2) may be provided to the subtractor 406(2), which may determine a difference between the two pixel values and provide the result to the respective abs 408(2). The results of adjacent pairs of abs 408, such as abs 408(1) and 408(2), may be provided to a respective max 410, such as max 410(1). The respective max 410 may determine which receive value is greater, e.g., the maximum value, and provide the max value to a respective max 412. For example, the maximum value determined by max 410(1) and 410(2) may be provided to max 412(1). This process of determining maximum values between all the pixel values currently held in the registers 402 and 404 cascades through the maximum elements 414, 416, and 418. In max 418, however, the determination of maximum value is determined between the current output of the max 416 and the zero value currently held in the register 422. The maximum difference determined by the max 418 may then be provided to the register 422 via the mux 420. The new maximum value in the register 422 may overwrite the prior value stored therein.

The process then continues based on the next clock cycles until a determination is made as to the maximum value, e.g., maximum difference between two adjacent pixel values in either the horizontal or vertical directions, within an 8 x 8 block of decoded baseband video. For example, at the third clock cycle, pixel values for the third row of eight pixels may be provided to the registers 402, the pixel values for the second row are moved to the registers 404, and the pursuing difference, absolute, and maximum determinations is made between the two rows of pixels, e.g., the second and third rows of pixels. This outcome is then compared to the maximum difference determined previously and the resultant is again stored in the register 422. The sequence continues for all eight rows, at which time the final maximum difference, or maximum activity, value is provided to the multiplier 426 to be scaled by the quantization parameter, the blocking point number, and the value of 128. The final value, the MD parameter, may then be provided as a configuration parameter to a de-ringing filter, for example.

Figure 5:
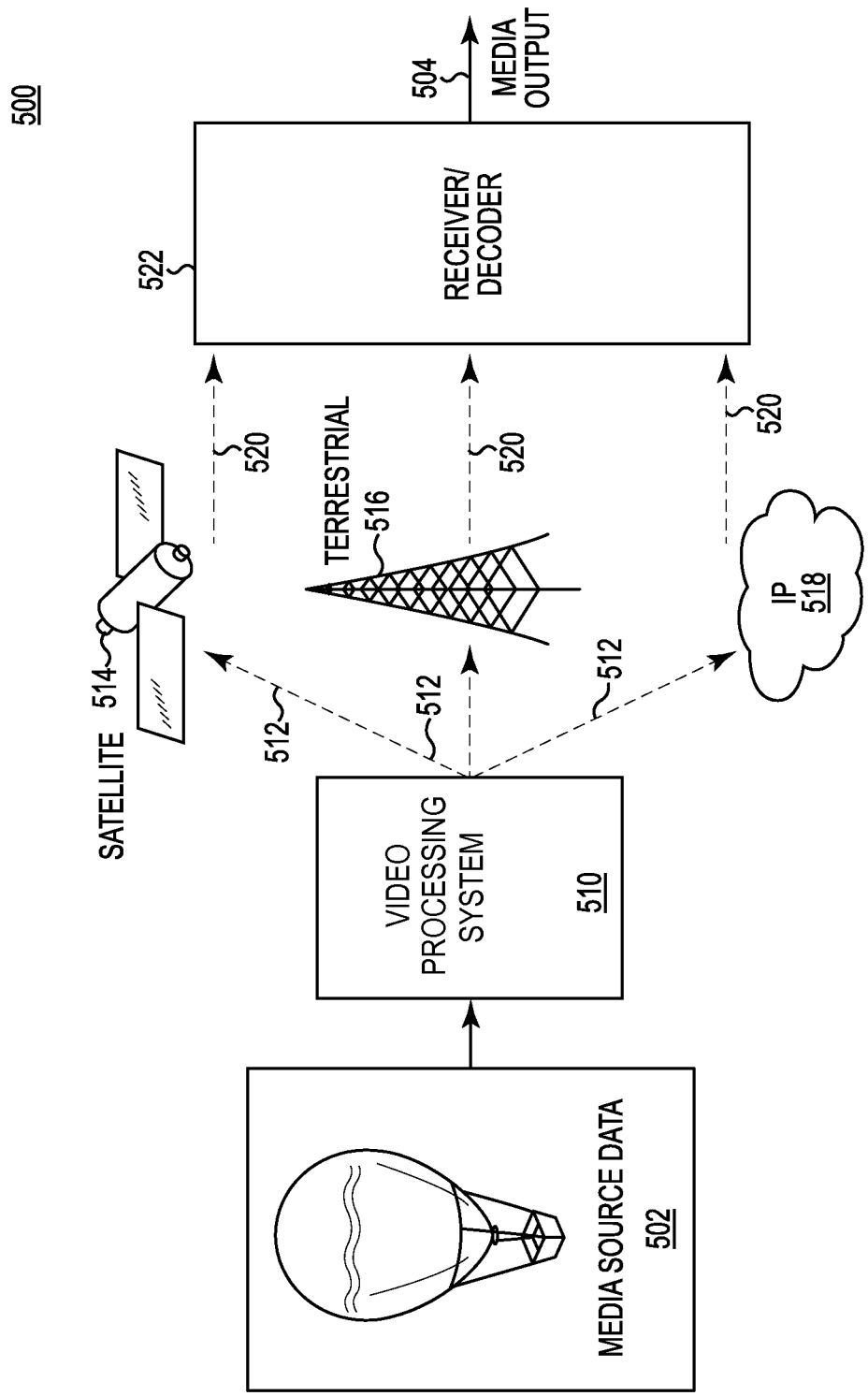
FIG. 5 is a schematic illustration of a media delivery system according to the present disclosure.

FIG. 5 is a schematic illustration of a media delivery system 500 in accordance with embodiments of the present invention. The media delivery system 500 may provide a mechanism for delivering a media source 502 to one or more of a variety of media output(s) 504. Although only one media source 502 and media output 504 are illustrated in FIG. 5, it is to be understood that any number may be used, and examples of the present invention may be used to broadcast and/or otherwise deliver media content to any number of media outputs.

The media source data 502 may be any source of media content, including but not limited to, video, audio, data, or combinations thereof. The media source data 502 may be, for example, audio and/or video data that may be captured using a camera, microphone, and/or other capturing devices, or may be generated or provided by a processing device. Media source data 502 may be analog and/or digital. When the media source data 502 is analog data, the media source data 502 may be converted to digital data using, for example, an analog-to-digital converter (ADC). Typically, to transmit the media source data 502, some mechanism for compression and/or encryption may be desirable. Accordingly, a video processing system 510 may be provided that may filter and/or encode the media source data 502 using any methodologies in the art, known now or in the future, including encoding methods in accordance with video standards such as, but not limited to, MPEG2, H.264, HEVC, VC-1, VP8 or combinations of these or other encoding standards.

The encoded data 512 may be provided to a communications link, such as a satellite 514, an antenna 516, and/or a network 518. The network 518 may be wired or wireless, and further may communicate using electrical and/or optical transmission. The antenna 516 may be a terrestrial antenna, and may, for example, receive and transmit conventional AM and FM signals, satellite signals, or other signals known in the art. The communications link may broadcast the encoded data 512, and in some examples may alter the encoded data 512 and broadcast the altered encoded data 512 (e.g. by re-encoding, adding to, or subtracting from the encoded data 812). The encoded data 520 provided from the communications link may be received by a receiver 522 that may include or be coupled to a decoder. The decoder may decode the encoded data 520 to provide one or more media outputs, with the media output 504 shown in FIG. 5. The receiver 522 may be included in or in communication with any number of devices, including but not limited to a modem, router, server, set-top box, laptop, desktop, computer, tablet, mobile phone, etc. The receiver 522 may be implemented with embodiments of the present disclosure described herein. For example, the receiver 522 may be implemented with the decoder 100 of FIG. 1.

The media delivery system 500 of FIG. 5 and/or the video encoding system 510 may be utilized in a variety of segments of a content distribution industry.

Figure 6:
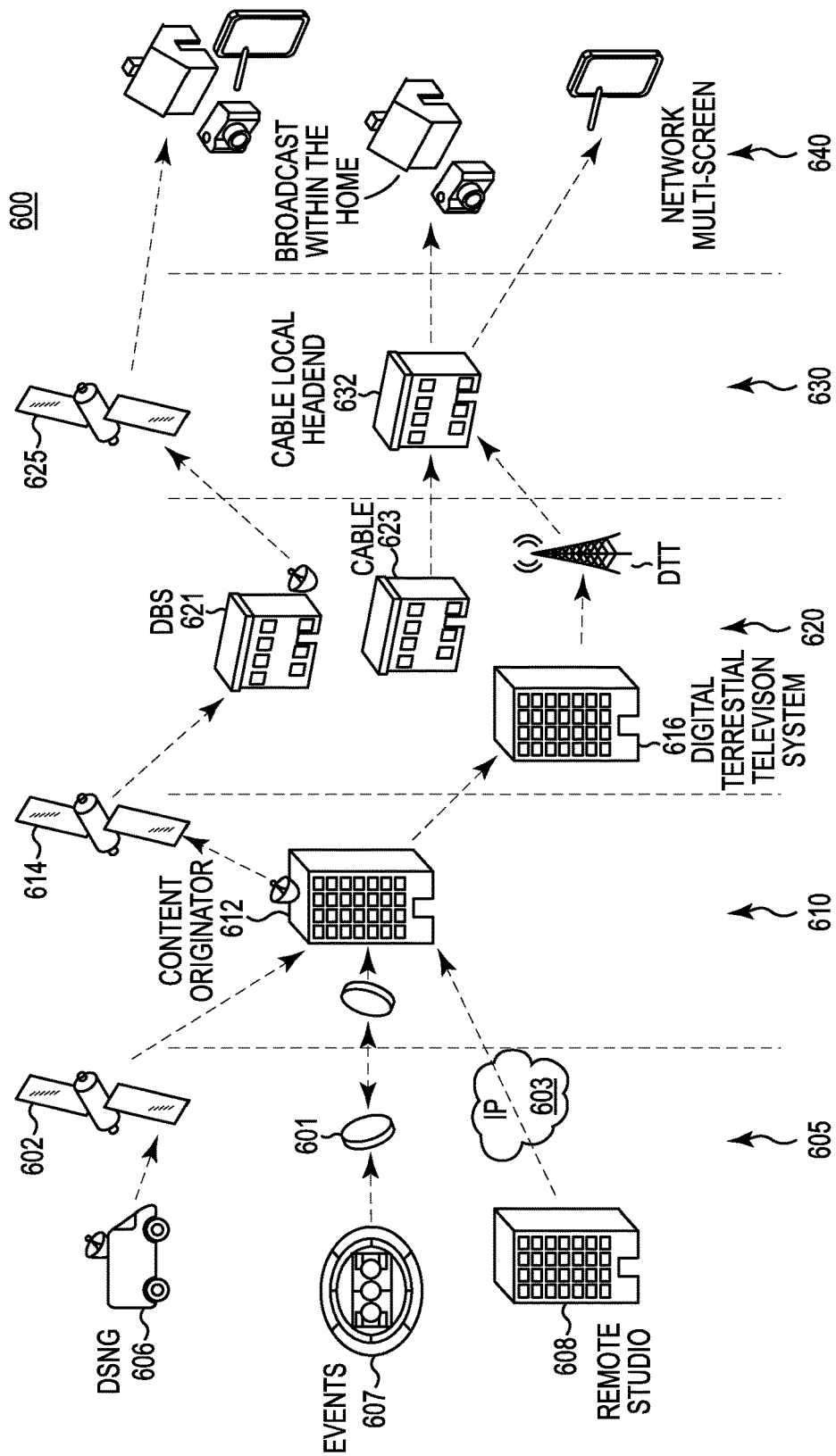
FIG. 6 is a schematic illustration of a video distribution system that may make use of video encoders described herein.

FIG. 6 is a schematic illustration of a video distribution system 600 that may make use of video decoding systems described herein. The video distribution system 600 includes video contributors 605. The video contributors 605 may include, but are not limited to, digital satellite news gathering systems 606, event broadcasts 607, and remote studios 608. The digital satellite news gathering system 606 may provide encoded data to a satellite 602. The event broadcast 607 may provide encoded data to an antenna 601. The remote studio 608 may provide encoded data over a network 603.

A production segment 610 may include a content originator 612. The content originator 612 may receive encoded data from any or combinations of the video contributors 605. The content originator 612 may make the received content available, and may edit, combine, and/or manipulate any of the received content to make the content available. The content originator 612 may utilize video processing systems, to provide encoded data to the satellite 614 (or another communications link) The content originator 612 may provide encoded data to a digital terrestrial television system 616 over a network or other communication link. In some examples, the content originator 612 may utilize a decoder, such as the decoder 100 of FIG. 1, to decode the content received from the contributor(s) 605. The content originator 612 may then re-encode data and provide the encoded data to the satellite 614. In other examples, the content originator 612 may utilize a transcoder to change a coding format of the received data, wherein the transcoder may include a decoder as described herein.

A primary distribution segment 620 may include a digital broadcast system 621, the digital terrestrial television system 616, and/or a cable system 623. The digital broadcasting system 621 may include a receiver, such as the receiver 522 described with reference to FIG. 5, to receive encoded data from the satellite 614. The digital terrestrial television system 616 may include a receiver, such as the receiver 522 described with reference to FIG. 5, to receive encoded data from the content originator 612. The cable system 623 may host its own content which may or may not have been received from the production segment 610 and/or the contributor segment 605. For example, the cable system 623 may provide its own media source data 502 as that which was described with reference to FIG. 5.

The digital broadcast system 621 may include a video encoding system to provide encoded data to the satellite 625. The cable system 623 may include a video encoding system to provide encoded data over a network or other communications link to a cable local headend 632. A secondary distribution segment 630 may include, for example, the satellite 625 and/or the cable local headend 632.

The cable local headend 632 may include a video encoding system to provide encoded data to clients in a client segment 640 over a network or other communications link. The satellite 625 may broadcast signals to clients in the client segment 640. The client segment 640 may include any number of devices that may include receivers, such as the receiver 522 and associated decoder described with reference to FIG. 5, for decoding content, and ultimately, making content available to users. The client segment 640 may include devices such as set-top boxes, tablets, computers, servers, laptops, desktops, cell phones, etc.

Accordingly, filtering, encoding, and/or decoding may be utilized at any of a number of points in a video distribution system. Embodiments of the present invention may find use within any, or in some examples all, of these segments.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

What is claimed is:

1. An apparatus comprising:
a decode module configured to (i) receive a bitstream, (ii) generate a block by decoding the bitstream and (iii) extract a quantization parameter used to encode the block from the bitstream;
a maximum difference module coupled to the decode module, and configured to (i) receive the block and the quantization parameter from the decode module, and (ii) determine a first threshold of the block based on a plurality of pixels in the block and the quantization parameter; and
a de-ringing filter module coupled to the maximum difference module and the decode module, and configured to (i) receive the first threshold from the maximum difference module, (ii) receive the block from the decode module, (iii) determine a second threshold based on the first threshold, wherein the second threshold is higher than the first threshold, (iv) determine a weighting factor for a first pixel among the pixels in the block based on a comparison of (a) an absolute difference between the first pixel and a second pixel among the pixels in the block with (b) the first threshold and the second threshold and (v) filter the second pixel based on the weighting factor.

2. The apparatus of claim 1, wherein the bitstream is encoded using an MPEG-2 compression format.

3. An apparatus comprising:
a decoder configured to (i) receive a bitstream, (ii) generate a plurality of blocks by decoding the bitstream and (iii) extract a plurality of quantization parameters used to encode the blocks from the bitstream; and
a processor coupled to the decoder and configured to (i) receive the blocks and the quantization parameters from the decoder, and (ii) determine a plurality of first thresholds of the blocks based on a plurality of pixels in each of the blocks and the quantization parameters, (iii) determine a plurality of second thresholds of the blocks based on the first thresholds, wherein the second threshold is higher than the first threshold, (iv) determine a weighting factor for a first pixel among the pixels in each of the blocks based on a comparison of (a) an absolute difference between the first pixel and a second pixel among the pixels in a same block with (b) the first threshold of the same block and the second threshold of the same block and (v) filter the second pixels based on the weighting factors.

4. A method for filtering ringing artifacts, comprising the steps of:
receiving a bitstream at a circuit;
generating a block by decoding the bitstream;
extracting a quantization parameter used to encode the block from the bitstream;
determining a first threshold of the block based on a plurality of pixels in the block and the quantization parameter;
determining a second threshold based on the first threshold, wherein the second threshold is higher than the first threshold;
determining a weighting factor for a first pixel among the pixels in the block based on a comparison of (i) an absolute difference between the first pixel and a second pixel among the pixels in the block with (ii) the first threshold and the second threshold; and
filtering the second pixel based on the weighting factor.

5. The method of claim 4, wherein the determination of the first threshold comprises:
determining a maximum activity of the pixels of the block;
generating a combined value by combining the quantization parameter and the maximum activity; and
scaling the combined value to produce the first threshold.

6. The apparatus of claim 1, wherein the determination of the first threshold comprises (i) determining a maximum activity of the pixels of the block, (ii) generating a combined value by combining the quantization parameter and the maximum activity and (iii) scaling the combined value to produce the first threshold.

7. The apparatus of claim 1, wherein the weighting factor is set to a zero value while the absolute difference is greater than the second threshold.

8. The apparatus of claim 1, wherein the weighting factor is set to a maximum value while the absolute difference is less than the first threshold.

9. The apparatus of claim 1, wherein the weighting factor is based on an interpolation between the first threshold and the second threshold while the absolute difference is greater than the first threshold but less than the second threshold.

10. The apparatus of claim 3, wherein the weighting factor is set to a zero value while the absolute difference is greater than the second threshold.

11. The apparatus of claim 3, wherein the weighting factor is set to a maximum value while the absolute difference is less than the first threshold.

12. The apparatus of claim 3, wherein the weighting factor is based on an interpolation between the first threshold and the second threshold while the absolute difference is greater than the first threshold but less than the second threshold.

13. The method of claim 4, wherein the determination of the weighting factor comprises:
setting the weighting factor to a zero value while the absolute difference is greater than the second threshold;
setting the weighting factor to a maximum value while the absolute difference is less than the first threshold; and
determining the weighting factor based on an interpolation between the first threshold and the second threshold while the absolute difference is greater than the first threshold but less than the second threshold.

14. The method according to claim 13, wherein the maximum value is based on an encoding format of the bitstream.

15. The method according to claim 4, further comprising the steps of:
generating a strength parameter; and
adjusting a strength of the filtering of the second pixel based on the strength parameter.

16. The apparatus according to claim 1, wherein (i) the maximum difference module is further configured to generate a strength parameter and (ii) the de-ringing filter module is further configured to (a) receive the strength parameter from the maximum difference module and (b) adjust a strength of the filtering of the second pixel based on the strength parameter.

17. The apparatus according to claim 8, wherein the maximum value is based on an encoding format of the bitstream.

18. The apparatus according to claim 3, wherein the processor is further configured to (i) generate a strength parameter and (ii) adjust a strength of the filtering of the second pixel based on the strength parameter.

* * * * *